United States Patent

Broussaud et al.

[15] 3,703,640

[45] Nov. 21, 1972

[54] SIGNAL SPECTRAL MULTIPLEXING SYSTEM

[72] Inventors: Georges Broussaud; Serge Lowenthal, both of Paris, France

[73] Assignee: Thomson - CSF

[22] Filed: Dec. 8, 1969

[21] Appl. No.: 882,880

[30] Foreign Application Priority Data

Dec. 17, 1968 France....................68178663

[52] U.S. Cl.....................................250/199, 350/162

[51] Int. Cl.................................................H04b 9/00

[58] Field of Search......250/199, 220; 350/150, 157, 350/160, 161, 162, 172, 174, 266, 270, 271, 275, 285

[56] References Cited

UNITED STATES PATENTS

| | | | |
|---|---|---|---|
| 3,055,258 | 9/1962 | Hurvitz | 250/199 |
| 3,264,611 | 8/1966 | Lohmann | 250/199 |
| 3,506,834 | 4/1970 | Buchsbaum et al. | 250/199 |

*Primary Examiner*—Albert J. Mayer
*Attorney*—Kurt Kelman

[57] ABSTRACT

A double-diffraction optical system associated with a monochromatic light source, with optical-electrical modulating means and with photo-electric detector means, for effecting the interlaced spectral multiplexing or demultiplexing of a plurality of electrical signals.

27 Claims, 11 Drawing Figures

INVENTORS
GEORGES BROUSSAUD
SERGE LOWENTHAL
By [signature]
AGENT

INVENTORS
GEORGES BROUSSAUD
SERGE LOWENTHAL
BY [signature] AGENT

INVENTORS
GEORGES BROUSSAUD
SERGE LOWENTHAL
By [signature]
AGENT

INVENTORS
GEORGES BROUSSAUD
SERGE LOWENTHAL
By [signature]
AGENT

INVENTORS
GEORGES BROUSSAUD
SERGE LOWENTHAL
By [signature]
AGENT

SIGNAL SPECTRAL MULTIPLEXING SYSTEM

The present invention relates to the multiplexing of a plurality of electrical signals for the transmission thereof through a single transmission channel. Strictly speaking, multiplexing impairs the quality of information transmission since several signals have to share the frequency band assigned to the integral transmission of the spectrum of a single one of them.

Nevertheless, by properly selecting the portions of the spectrum of a signal the transmission of the latter may be reduced to discrete slices of the frequency band. It is thus entirely feasible to interlace, by spectral multiplexing, the spectra of several electrical signals, thus multiplying by two or more the transmission capacity of a telephone or television channel. The splitting up into "slices" of the frequency spectrum of an electrical signal, is generally carried out by means of electrical filters ; these filters have to be provided in large numbers where the ratio of the extreme frequencies of this signal is high. In addition, they are very delicate items of equipment. Since the problem considered involves the splitting of several spectra into several slices which have to be arranged in precise juxtaposition to one another, the process of spectral multiplexing is rather hard ; and has so far not been solved successfully in spite of the many advantages which such multiplexing offers in relation to other multiplexing systems.

It is an object of this invention to provide a solution to this problem.

According to the invention there is provided a spectral multiplexing electro optical apparatus for generating a multiplexed signal whose frequency spectrum comprises interlaced spectral bands respectively belonging to the frequency spectra of N electrical signals, N being an integer at least equal to two, said multiplexing apparatus comprising : a monochromatic luminous source emitting N distinct luminous beams, N electro optical modulators positioned for respectively modulating said N beams, said modulators having respective control inputs respectively receiving said N electrical signals ; N first diffracting systems respectively positioned on the path of said N beams ; an optical interlacing device positioned for receiving the luminous energy diffracted from said N first diffracting systems, said interlacing device supplying an interlaced luminous beam comprising juxtaposed pencils of light respectively diffracted by said N first diffracting systems ; a second diffracted system positioned for receiving said interlaced luminous beam ; and photoelectric means positioned for receiving the diffracted luminous energy emerging from said second system.

For a better understanding of the invention and to show how the same may be carried into effect reference will be made to the drawing accompanying the ensuing description and in which :

FIGS. 1*a*–1*d* and 2 are explanatory figures.

Figure 7:
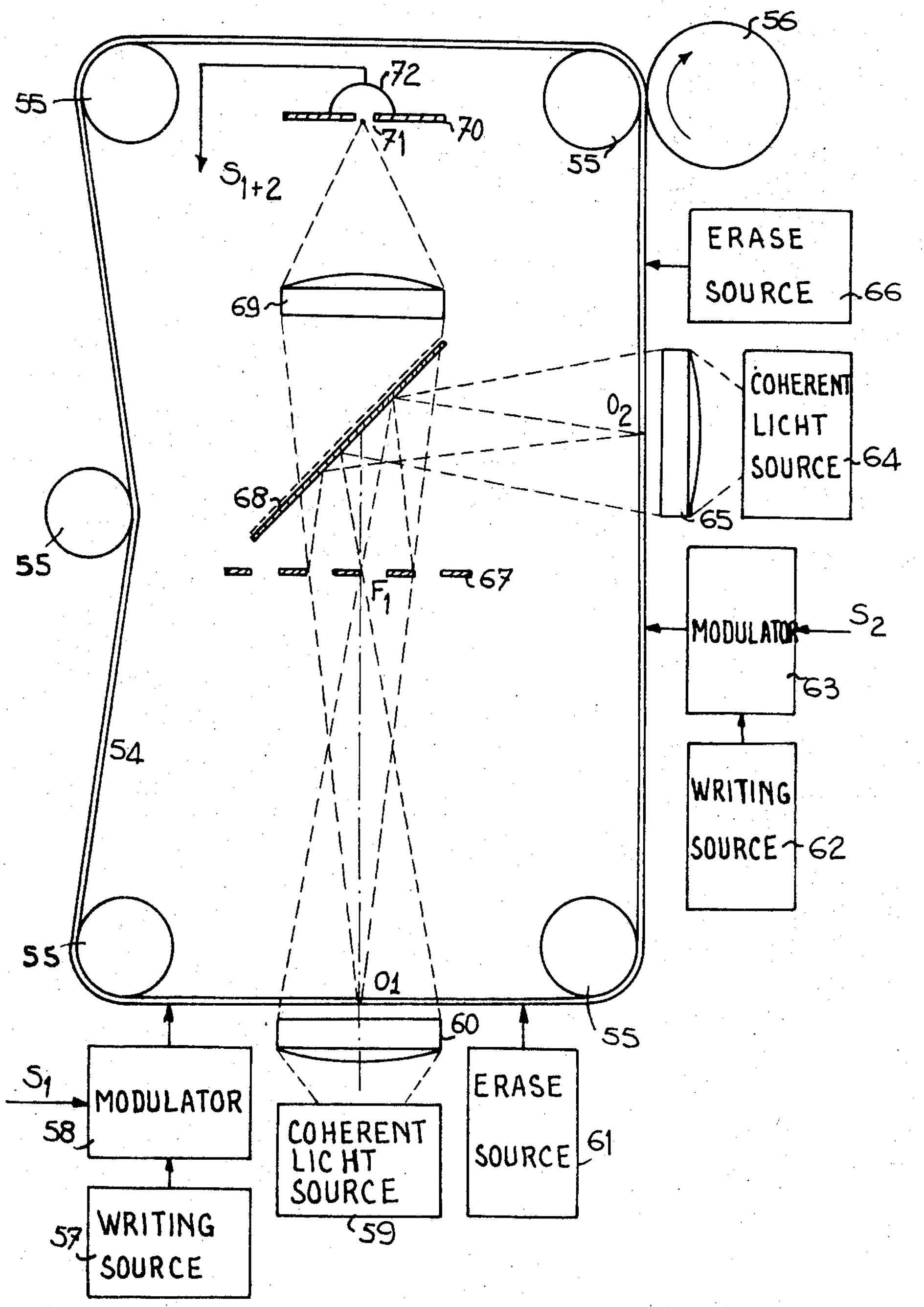

FIG. 7 schematically illustrates a variant embodiment of the multiplexing device in accordance with the present invention.

Figure 8:
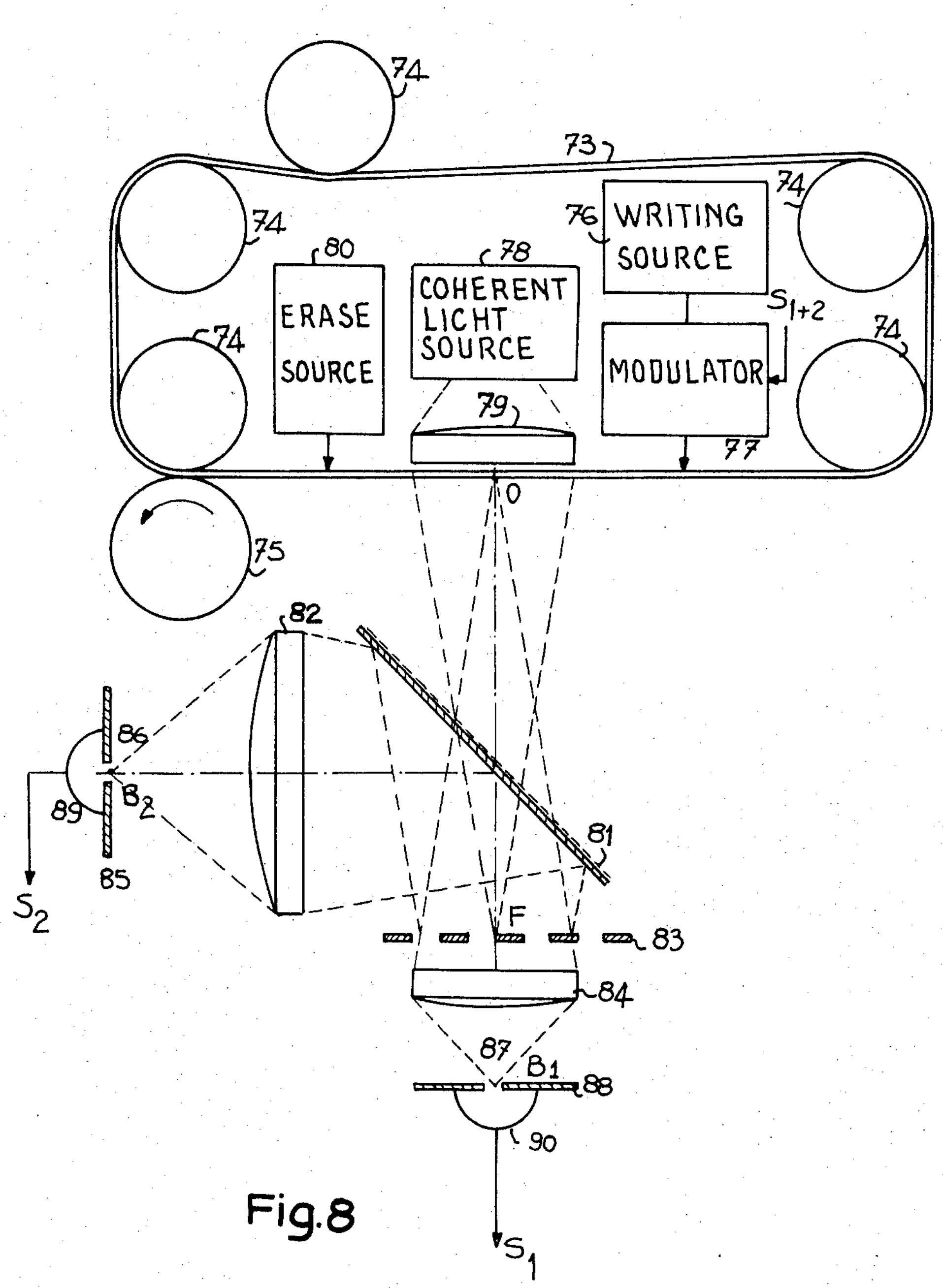

FIG. 8 schematically illustrates a variant embodiment of the demultiplexing device in accordance with the invention.

Figures 1A, 1B, 1C, 1D:
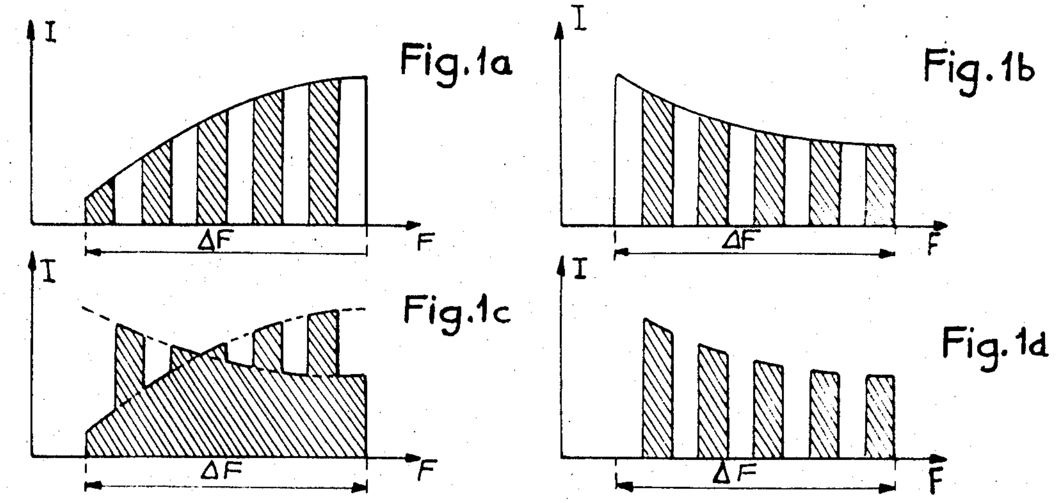

FIG. 1(*a*) shows the frequency spectrum $I=f(F)$ of an electrical signal $S_1$ ; this spectrum covers a frequency band $\Delta$ F which has been split into several adjacent slices. FIG. 1 (*b*) illustrates the frequency spectrum $I=f$ (F) of a second electrical signal $S_2$ with the same frequency band, which is likewise subdivided into slices. In FIG. 1 (*c*), the frequency spectrum $I=f(F)$ of an electrical signal $S_3$ made up by the interlacing of the slices shown crosshatched in FIGS. 1 (*a*) and 1 (*b*), can be seen ; signal $S_3$ occupies the same bandwidth $\Delta$ F as the signals $S_1$ and $S_2$. If it is desired to extract from the signal $S_3$ the information relating to signal $S_2$, all that is necessary is to select from its spectrum the even-number slices i.e those originating from signal $S_2$ ; this is what has been done in FIG. 1 (*d*), where the spectrum $I=f(F)$ of the signal $S_2$ has been illustrated, with its odd-number slices removed.

As FIG. 1 shows, the spectral multiplexing of two signals $S_1$ and $S_2$ necessitates accurate splitting of their respective spectra, since spectral slices alternately originating from these two signals are to be juxtaposed. The reverse operation of demultiplexing, likewise requires accurate splitting of the composite spectrum of the signal $S_3$, since it is necessary to isolate from one another the spectral slices belonging to $S_1$ and $S_2$. The use of conventional electrical filters is out of the question since it is necessary to provide a very large number of spectral slices in order to be able to correctly reconstruct the information contained in each of the signals. Furthermore, the retrieval of the information from filtered spectral elements implies that the phase shifts introduced by the filtering networks are strictly controlled.

Figure 2:
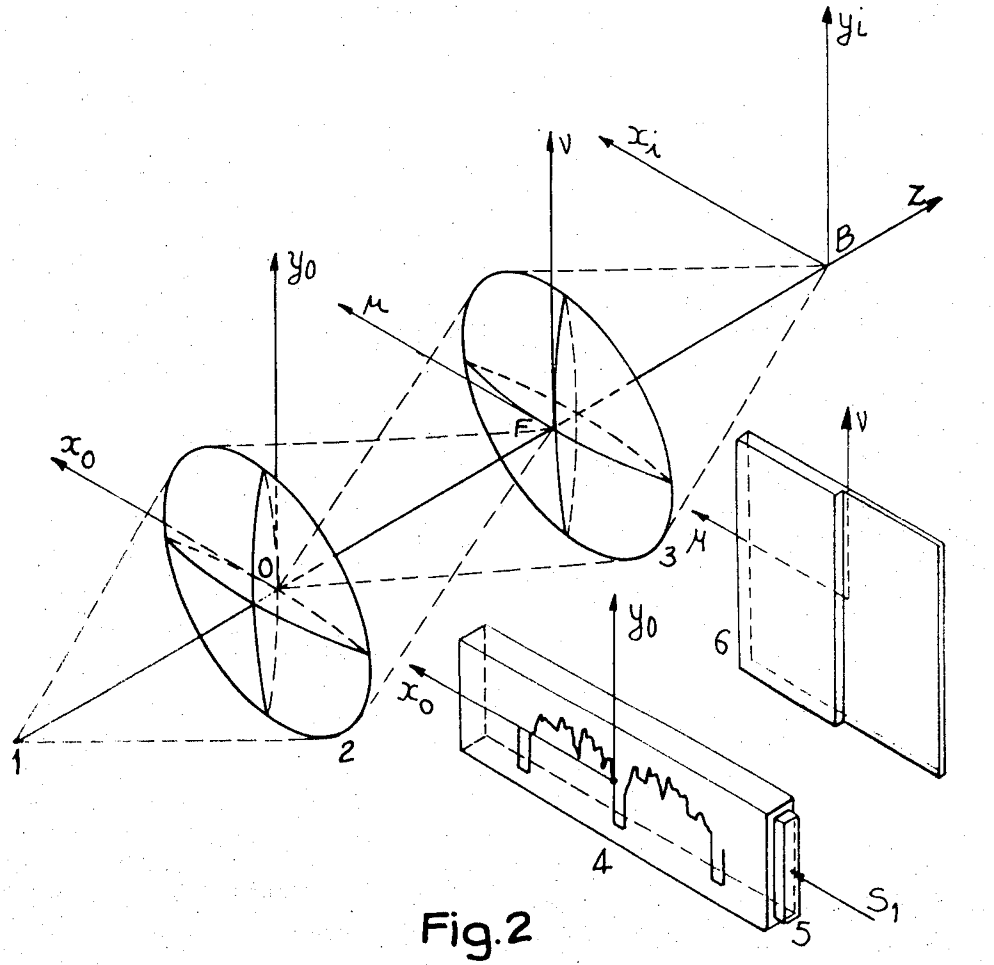

These difficulties can be overcome by using the technique of optical filtering with monochromatic light. The principle of this technique is illustrated in FIG. 2, which shows a monochromatic light source 1 located upon an optical axis Z ; at O, F and B there are illustrated the respective planes $(x_o, y_o)$, $(\mu, \nu)$ and $(x_i, y_i)$. A first lens 2 situated close to the object plane $(x_o, y_o)$ produces at F an image of the source 1 ; a second lens 3 situated close to the plane $(\mu\ \nu)$ forms at B the image of the point O. The system shown in FIG. 2 is a double-diffraction optical system which has the following properties :

1. A light amplitude distribution which can be represented in the plane $x_o\ y_o$ by the complex function O $(s_o, y_o)$, produces in the plane $(\mu, \nu)$ another light amplitude distribution which is defined by the equation :

$$O(\mu, \nu)=\int\int_{-\infty}^{+\infty} O(x_o, y_o)e^{-j(\mu x_o+\nu y_o)}dx_o dy_o$$

the distribution O $(\mu, \nu)$ represents the spectrum of the spatial frequencies of an optical signal O $(x_o, y_o)$.

2. The light amplitude distribution i $(x_i, y_i)$ obtained in the plane $x_i\, y_i$, i.e. the plane where the diffraction due to the lens 3 occurs, being linked by a similar kind of equation to the distribution emerging from the plane $(\mu\ \nu)$, if a portion of the spatial spectrum is filtered in the plane $\mu\ \nu$ the remaining portion will, give rise in the plane $(x_i, y_i)$ to a reconstructed optical signal i$(x_i y_i)$ which is the filtered signal O.

It is therefore possible to use the double-diffraction optical system of FIG. 2, in order to split into slices the frequency spectrum of an electrical signal. To this end, the electrical signal $S_1 = f(t)$ has first to be converted into an optical modulating signal which may be used to modulate in the plane $x_o$, $y_o$, the light beam produced by the source 1. This conversion requires a change in variable since the signal $S_1 = f(t)$ available is a function of time whereas the required modulating signal $S_1 = f(x_o)$, should be a function of the coordinate $x_o$.

In FIG. 2, outside the optical system 1, 2, 3, there has been illustrated a bar 4 cut from a refractive material and equipped on one of its faces with an electromechanical transducer 5 capable of exciting a deformation wave propagating in a direction $x_o$ at a constant speed C. The signal $S_1 = f(t)$ excites the transducer 5 and the latter produces in the bar 4 a vibratory wave defined by the function $S_1 = f(x_o - ct)$ : under the action of this wave the refractive index of the medium 4 is modulated and accordingly the variation of the index both in space and in time can be used to modulate the light issued from the source 1. Upon transmission through the medium 4 the light beam is phase-modulated and since as it will be seen hereinafter the light will be again converted into electrical signal as a function of its amplitude, phase modulation is to be converted into amplitude modulation. This can be effected by placing into the plane $(\mu, \nu)$ a phase contrast filter 6. The filter 6 receives the radiation diffracted by the lens 2, and transmits the two radiation portions respectively occuring at either side of the axis $\nu$, with a relative phase-shift. The rays emerging from the lens 3 provide then in the plane $(x_i, y_i)$ amplitude modulated light which is then propagated through an another double-diffraction optical system similar to that shown in FIG. 2 but not comprising filters 4 and 6 as already mentioned for obtaining again a luminous signal amenable to transformation into on electrical signal. It should be noted at this juncture that it is equally possible to obtain an amplitude modulated luminous signal corresponding to the signal $S_1 = f(t)$ by employing polarized light, that is to say by surrounding the bar 4 by a polarizer and an analyzer ; in this case, the phase contrast optical system can be discarted.

Figure 3:
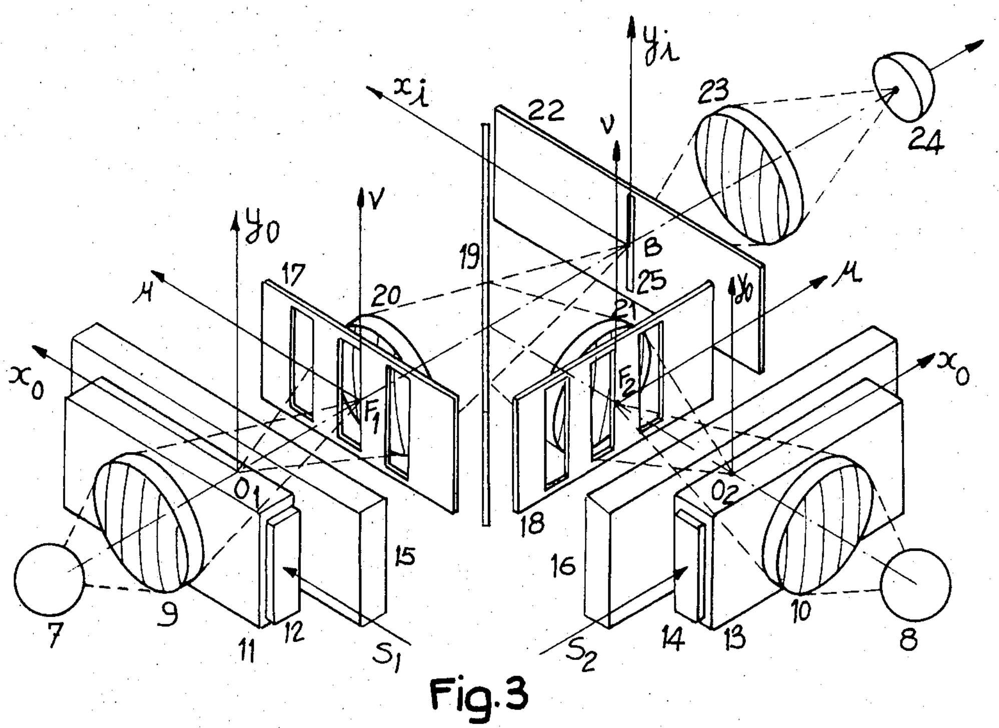
FIG. 3 is a schematic isometric view of a spectral multiplexing device in accordance with the invention.

FIG. 3 shows, a first optical-electrical device according to the invention for carrying out the spectral multiplexing of an electrical signal $S_1(t)$ and of another electrical signal $S_2(t)$ . It comprises a monochromatic light source 7 and optical means, which have not been shown, for deriving a second source 8 synchronous with the source 7. The sources 7 and 8 are centered respectively upon the optical axes $O_1 F_1$ and $O_2 F_2$ ; lenses 9 and 10 focus respectively at $F_1$ and $F_2$, the light beams issuing from sources 7 and 8. These beams are respectively modulated in the neighborhood of the lenses 9 and 10 by means of acoustic transmission lines 11 and 13, respectively associated with the phase contrast devices 15 and 16 as described. The lines 11 and 13 are respectively excited by electrical signals $S_1$ and $S_2$, which are respectively applied to the electromechanical transducer 12 and 14 thereof. At $O_1$ and $O_2$ there are respectively illustrated object planes $(x_o, y_o)$ in which amplitude modulated light spreads along axes $x_o$ as sets of lines parallel to $y_o$. At any instant, the law of variation of luminosity of these lines along the $x_o$ axes is substantially the same as the law of variation versus time of the amplitude of the signals $S_1$ and $S_2$ respectively. The distribution of these lines moves in the direction $s_o$ at the speed C of the deformation waves excited by the transducers 12 and 14 in the lines 11 and 13 respectively. At $F_1$ and $F_2$ there are respectively interposed filters 17 and 18 in the respective planes $(\mu\ \nu)$ of which, by optical diffraction, the spatial frequency spectra of the light amplitude distributions emerging from the respective object planes $(x_o, y_o)$ are formed. These spectra are made up of stationary lines representative of the portions of the signals $S_1$ and $S_2$ propagating through lines 11 and 13 respectively.

It should be noted that the distributions emerging from the planes $(x_o, y_o)$ have a uniform translatory motion ; this uniform translation does not involve any displacement of the spectra in the planes $(\mu\ \nu)$ since such a translation would only affects the phase of the luminous spectral lines. The spectral multiplexing is effected by the optical filters 17 and 18 ; which, in response to the frequency spectra of the signals $S_1$ and $S_2$, transmit spectral slices which are optically juxtaposed by means of a semitransparent mirror 19. Between the mirror 19 and the filters 17 and 18, lenses 20 and 21 are arranged which are designed to form at B the images of points $O_1$ and $O_2$ as explained above. Due to this arrangement, the plane $(x_i, y_i)$ acts as image plane and receives an illumination which represents the Fourier transform of the interlaced spectrum formed by means of the filters 17 and 18 and the mirror 19. The light image which is formed in the plane $(x_i, y_i)$, corresponds to the spectral interlacing of the light signals available in the two planes $(x_o, y_o)$ ; this image moves along a parallel to the axis $x_i$ and in order to analyze it, a diaphragm 22 containing a slot 25 is provided. A lens 23 picks up the light passing through the slot 25 and directs it onto a photoelectric transducer 24 which produces the multiplexed electrical signal. The assembly comprising filters 17 and 18 and the mirror 19, is an optical interlacing device which can be designed to receive the spatial frequency spectra of N signals which are to be multiplexed The formation of these N spectra involves N optical-electrical modulators such as (11, 15) and (13, 16) which in FIG. 3, are associated with first diffracting systems 9 and 10. The interlaced spectrum produced by the interlacing device is processed by further diffracting means 20 and 21 and analyzed by an opticalelectrical detecting system 22, 23, 24 in order, ultimately, to obtain the multiplexed electrical signal representing the N input signals $S_1, S_2, \ldots S_N$.

Figure 4:
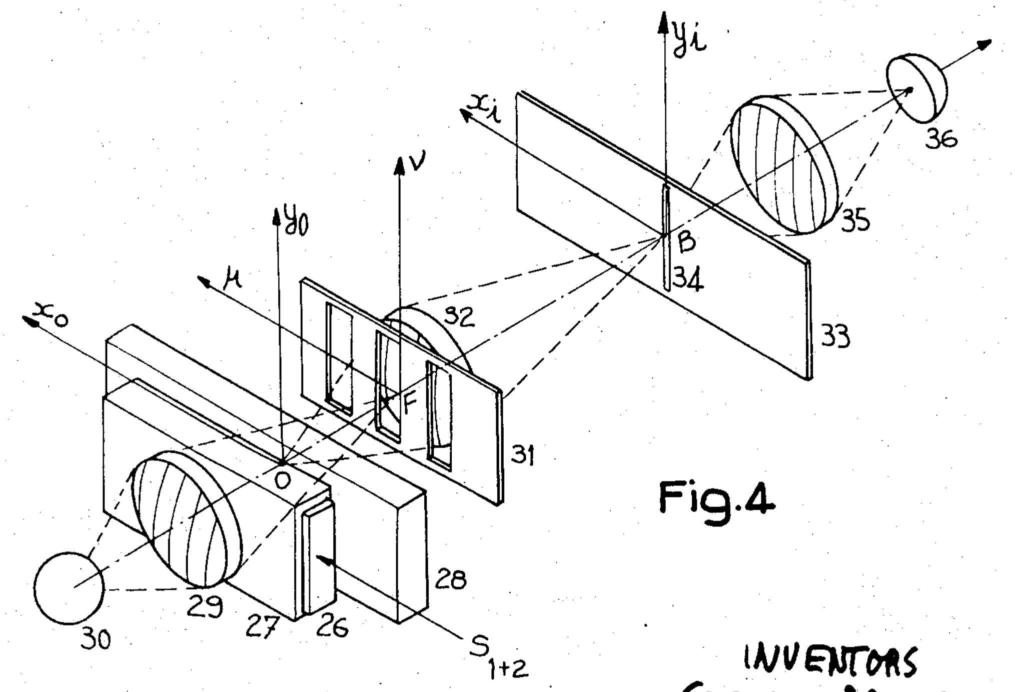
FIG. 4 is a schematic isometric view of a demultiplexing device in accordance with the invention.

FIG. 4, shows by way of example a device by which demultiplexing of the electrical signal furnished by the system of FIG. 3, can be carried out. The electrical signal to be demultiplexed is applied to an optical-electrical modulator comprising an electromechanical transducer 26 coupled to a transparent bar 27, and an optical phase contrast device 28 ; a source 30 of monochromatic light beam which passes through the optical-electrical modulator 27, 28 ; a lens 29, which forms a first diffracting system and concentrates the beam issuing from the source 30, at the F. At O, the object plane $(x_o,y_o)$ has been illustrated in which there is formed a light amplitude distribution representative of the electrical signal $S_{1+2}$; at F this distribution gives rise to a spatial frequency spectrum which spreads along the plane $(\mu, \nu)$. This spectrum is the interlaced spectrum resulting from the multiplexing of signals $S_1$ and $S_2$ and it is possible to isolate from it the spectral bands corresponding say to signal $S_1$, by placing in the plane $(\mu\ \nu)$ a filter 31 which is equipped with appropriate windows. The radiation transmitted by the filter 31 is received by a lens 32 which acts as a second diffracting system ; the lens 32 forms, at B, the image of the point O and transforms those portions of the spectra which have been passed by the filter 31, into an image of the signal $S_1$, which image is projected on to the plane $(x_i,y_i)$ passing through B. A diaphragm 33 containing a slot 34, analyses the image formed in the plane $(x_i,y_i)$ . The slot 34 illuminates a photoelectric transducer 36 through a collecting lens 35, so that said transducer produces the electrical signal $S_1$.

The optical filters 17, 18 and 31 used in the devices of FIGS. 3 and 4, exhibit transparent and opaque zones designed in the form of slots and parallel bars. When the spectral multiplexing of two signals is being carried out, a constant width can be given to the slots and the bars, and this makes it possible, by suitably staggering, the respective slots of the filters 17 and 18, to select the odd or the even frequency bands of the spectrum.

It should be noted that the slots and bars form diffraction networks which may form in the image plane $(x_{i,i}$ a principal central image and secondary images.

In order to prevent the photodetector element from reading the information several times, it is necessary that the secondary images should be formed outside the field of the central image. With a uniform pitch filter, this means the use of a number of slots equal to the largest number of light alternations which can be comprised in optical signals distributed along the axis $x_o$. This number of slots represents an upper limit as far as filtering is concerned, since the operation cannot be carried out unless the spectral lines have a width smaller than that of the bars of the filter grid.

In order to obtain a central image free from secondary diffraction images of the filters 17 or 18, and in order to achieve efficient filtering, the invention provides for the use of filters the pitch of which varies in accordance with a pseudo-random law or in accordance with a logarithmic law. This kind of filter can be formed by bars and slots the width of which is proportional to the distance separating them from the center of the grating.

The electro-optical modulators schematically illustrated in FIGS. 2 to 4 are appropriate to the carrying out of the multiplexing of television signals, since these are made up of a succession of video lines transmitted with a short periodicity. An acoustic line of some tens of centimeters in length makes is possible to store during a time equal to its duration one line of a television signal. If line by line multiplexing of television signals is carried out, then the "moire" effect appearing in certain images can be prevented by arranging at the input of the multiplexing device and at the output of the demultiplexing device, permutating arrangements which are controlled by the synchronization signals of the television system.

The synchronous permutation of the television channels can be carried out after the transmission of each frame ; thus thanks to the interlacing of the even and odd lines, the moire effect is eliminated.

Without departing from the scope of the invention, the interlaced spectral multiplexing can be carried out by means of optical filters provided with reflective coatings.

Figure 5:
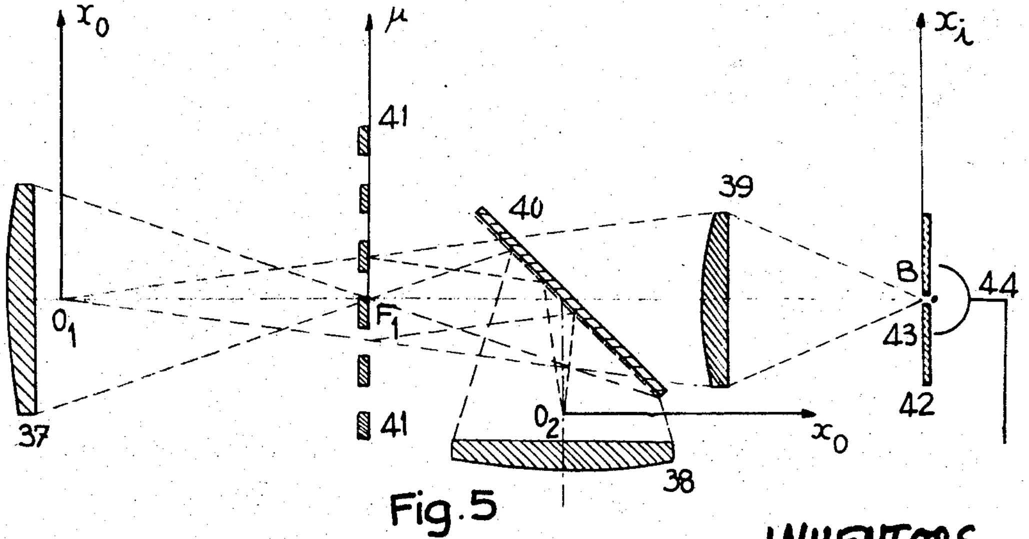
FIG. 5 is a variant embodiment of the device shown in FIG. 3.

FIG. 5 illustrates a simplified diagram of a multiplexing device using a reflective optical filter. This device is akin to that of FIG. 3 ; for purposes of clarity of the drawing, the light source and the modulator means have not been shown but the lines $O_1\,x_o$ and $O_2\,x_o$ of the object planes from which the modulated light beams emerge have been drawn in. The lenses 37 and 38 are the first diffractive optical systems ; the beams emerging from the planes $x_o$ are focused by lenses 37 and 38 at $F_1$ in the filter plane defined by the line $F_1\,\mu$ ; the lens 37 produces a first spectrum on the left hand face of the plane $\mu$ and the lens 38 associated with the semi-reflective mirror 40, produces a second spectrum upon the right hand face of the same plane $\mu$. These spectra are filtered and interlaced by means of a grid 41 carrying reflective bars located in the plane $\mu$ ; the portion of the first spectrum which is transmitted, and the portion which is reflected, of the second spectrum, both propagate through the mirror 40 and are picked up by the lens 39. The lens 39 forms, at B, the image of the points $O_1$ and $O_2$ so that the illumination of the plane $x_i$ is in fact the Fourier transform of the interlaced spectra ; the diaphragm 42 contains a slot 43 which co-operates with a photoelectric detector 44.

Figure 6:
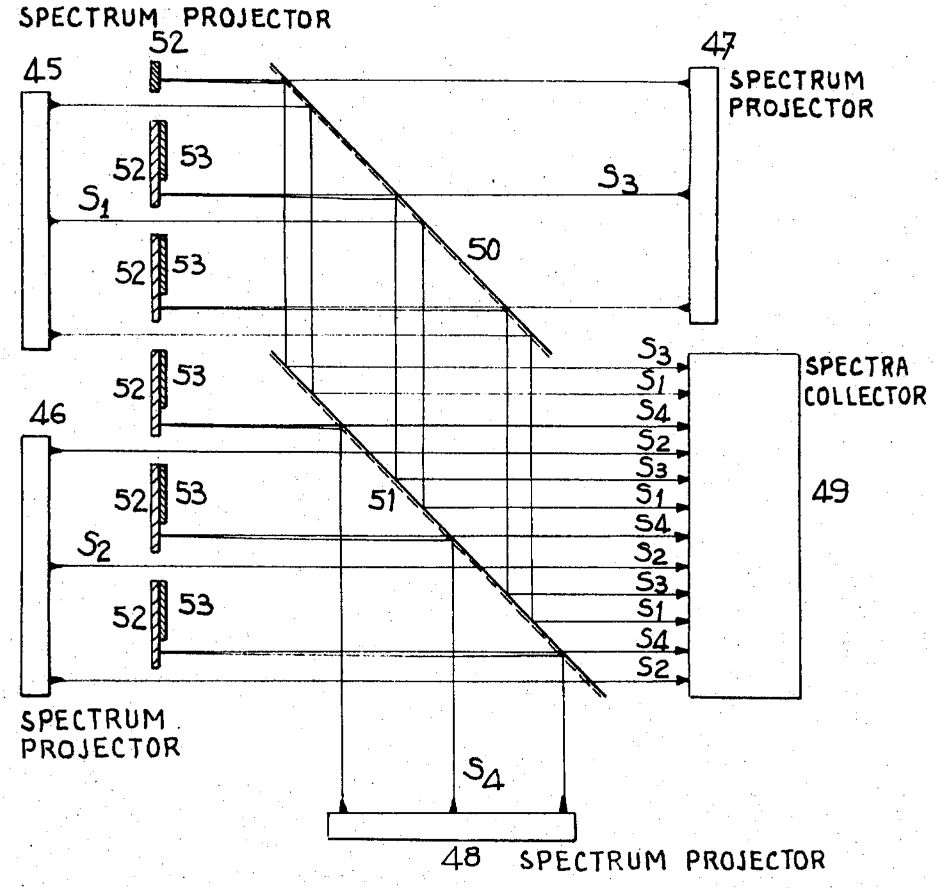
FIG. 6 illustrates an optical interlacing device for the spectral multiplexing of four signals.

The foregoing diagrams employ optical interlacing devices which are provided for the juxtaposition of two frequency spectra. In FIG. 6, an optical interlacing device can be seen which is designed to interlace spectral bands belonging respectively to four signals $S_1$, $S_2$, $S_3$, and $S_4$. Blocks 45, 46, 47 and 48 symbolize optical devices including those elements shown in front of filters 17 and 18 in FIG. 3. Optical devices 45, 46, 47 and 48 thus project the spectra of these four signals and the interlaced spectrum is collected by the optical device 49. The interlacing is effected by means of two semi-reflective mirrors 50 and 51 ; the filtering of the spectral bands is effected by means of an optical filter 52 the slots of which are only a third the width of the bars ; the bars are reflective over a third of their width and are coated over the other two-thirds with absorbtive layers 53. The path taken by the light rays is as follows : The rays emerging from the device 45 (signal $S_1$) are transmitted by the filter 52 and are thereafter successively reflected by the mirrors 50 and 51 ; the rays emerging from the device 46 (signal $S_2$) are transmitted by the filter 52 and by the mirror 51 ; the rays emerging from the device 47 (signal $S_3$) pass through the mirror 50 and are then successively reflected at the filter 52 and the mirrors 50 and 51 ; the rays emerging from the device 48 (signal $S_4$) are successively reflected by the mirror 51 and the filter 52, and then transmitted by the mirror 51.

The modulation of a light beam by means of acoustic transparent lines propagating the modulating signal in the form of a deformation wave, is something which is hardly feasible if the duration of the sections of signal which are multiplexed is large because in that case the size of the line becomes prohibitive.

In telephony, one is faced with the problem of producing an optical modulator which is capable of transposing sections of an electrical signal which have durations of several milliseconds. To achieve this, the invention provides a system based upon the exploitation of photochromic substances. Photochromic substances, such as salicylic derivatives of salicylanilide, when incorporated in a transparent substrate, give to said substrate the property of becoming opaque under the effect of ultra-violet radiation, and of regaining their initial transparence under the effect of infra-red radiation. They are well known.

FIG. 7, shows a system for achieving spectral multiplexing of two electrical signals $S_1$ and $S_2$ which are split into 10 millisecond slices. The device is made up of a photochromic strip 54 in the form of a loop taken around rollers 55 ; this loop is driven at constant linear speed by a drive mechanism 56.

The strip 54 is illuminated by a flat beam of ultraviolet light emerging from an electro-optical modulator 58 of a known type, which modulates by the signal $S_1$ and ultraviolet beam produced by a source 57. After the strip 54 has passed the modulator 58, it has a variable transparency which optically modulates the light beam emitted by a monochromatic light source 59. After having passed the lens 60, the loop is exposed to infra-red radiation from a source 61 which radiation erases any modulation from the strip 54. A further modulator system is provided for the signal $S_2$ ; it comprises an ultra-violet light source 62, an optical-electrical modulator of a known type 63, a monochromatic light source 64, obtained by tapping off part of the radiation from the source 59, a lens 65 and an infra-red erase source 66. The system of FIG. 7 comprises, in addition to lenses 60 and 65, a spectral interlacing device such as that shown in FIG. 5, comprising a filter 67 and a semi-transparent mirror 68. The second diffraction of the interlaced spectrum thus produced is carried out by a lens 69. A diaphragm 70 containing a slot 71 analyses the radiation issuing from the lens 69, and a transducer 72, converts the light energy received by the slot 71 into a multiplexed electrical signal $S_{1+2}$. The device of FIG. 7 operates in a manner similar to the device of FIG. 5 as far as multiplexing is concerned. The substitution of a loop 54 for the transmission lines 11 and 13 employed in the earlier described arrangement, in no way alters the nature of the light amplitude distributions which are formed in the object planes $x_0$. In FIG. 7, the object planes are formed by the surface of the band 54 in the neighborhood of the points $O_1$ and $O_2$ , the filter plane $\mu$ corresponds to the plane of the filter 67 and the image planes $x_i$ corresponds to the plane of the diaphragm 70.

In FIG. 8, a demultiplexing device which utilizes a photochromic loop, can be seen. It comprises a loop 73 of photochromic material tensioned around the rollers 74 and driven at constant linear speed by a drive mechanism 75. A flat beam of ultra-violet light, being emitted by a light source 76 and being modulated by the electrical signal $S_{1+2}$ applied to an optical-electrical modulator 77 acts on the band 73. The impressed section of the band 73 passes through the light beam coming from a monochromatic light source 78 ; the beam is focused at F in a filter plane containing a filter 83 similar to that shown in FIG. 5 and made up of slots and reflective bars ; after passage through the beam focused by the lens 79, the band 73 is subject to the effect of infra-red radiation which is produced by an erasing device 80. In the plane of the filter 83, the lens 79 forms the interlaced spectrum of the two signals $S_1$ and $S_2$ ; that portion of said spectrum which is transmitted is received by lens 84 arranged in such fashion as to form, at $B_1$, the image of the center 0 of the light amplitude distribution corresponding to the multiplexed signal $S_{1+2}$ ; the reflected portion of said spectrum is reflected again by a semi-transparent mirror 81, and picked up by a lens 82 which, at $B_2$, forms the image of the center 0. Diaphragms 85 and 88, with their respective slots 86 and 87, pick up at $B_1$ and $B_2$ the rays emerging from the lenses 82 and 84 ; these rays are respectively picked up by the photoelectric transducers 89 and 90 respectively producing the electrical signals $S_2$ and $S_1$.

Of course the invention is not limited to the embodiments described and shown which were given solely by way of examples. Thus instead of the lenses, any other optical arrangement could be used, provided they carry out a Fourier transform.

WHAT IS CLAIMED, IS :

1. A spectral multiplexing electro optical apparatus for generating a multiplexed signal whose frequency spectrum comprises interlaced spectral bands respectively belonging to the frequency spectra of N electrical signals, N being an integer at least equal to two, said multiplexing apparatus comprising : a monochromatic luminous source simultaneously emitting N distinct luminous beams, N electro optical modulators positioned for respectively modulating said N beams, said modulators having respective control inputs respectively receiving said N electrical signals ; N first diffracting systems respectively positioned on the path of said N beams ; an optical interlacing device positioned for receiving the luminous energy diffracted from said N first diffracting systems, said interlacing device supplying an interlaced luminous beam comprising juxtaposed pencils of light respectively diffracted by said N first diffracting systems ; a second diffracting system positioned for receiving said interlaced luminous beam ; and photo-electric means positioned for receiving the diffracted luminous energy emerging from said second system.

2. A spectral demultiplexing electro optical apparatus for demultiplexing a multiplexed signal as supplied by the spectral multiplexing system as claimed in claim 1, said spectral demultiplexing apparatus comprising a monochromatic luminous source emitting a luminous beam ; an electro optical modulator positioned for modulating said beam, said modulator having a control input for receiving said multiplexed signal resulting from the interlaced spectral multiplexing of said N electrical signals ; a first diffracting system positioned on the path of said luminous beam ; an optical separating device positioned for receiving the luminous energy diffracted by said diffracting system ; said separating device supplying a filtered beam comprising selected portions of the diffracted luminous energy emerging from said first diffracting system ; a second diffracting system positioned for receiving said filtered beam ; and photoelectric means positioned for receiving the luminous rays emerging from said second diffracting system.

3. A spectral multiplexing apparatus as claimed in claim 1, wherein each of said N electro optical modulators comprises a transparent plate, electro mechanical transducer means coupled to said plate for exciting therein a deformation wave corresponding to one of said electrical signals, and optical phase contrast means associated to said plate for converting the refractive index changes induced by said wave into corresponding changes of the luminous amplitudes emerging from said modulator.

4. A spectral multiplexing apparatus as claimed in claim 1, wherein each of said N electro optical modulators comprises a transparent strip carrying a photochromic substance, means for translating said strip at constant speed, a writing source of light capable of modifying the optical absorption coefficient of said photochromic substance, an erasing source of light positioned for bleaching said substance and an electro optical modulating cell positioned for modulating a pencil of light emerging from said writing source and incident onto said strip.

5. A spectral multiplexing apparatus as claimed in claim 4, wherein said writing source is a source of ultra-violet light ; said erasing source being a source of infra-red radiation.

6. A spectral multiplexing apparatus as claimed in claim 1, wherein said N first diffracting systems are converging lenses positioned for focusing said N beams.

7. A spectral multiplexing apparatus as claimed in claim 1, wherein said second diffracting system comprises a lens for forming on the input face of said photoelectric means an image of the output face of said modulators.

8. A spectral multiplexing apparatus as claimed in claim 1, wherein said photoelectric means comprise a mask having a slit and a photoelectric transducer positioned behind said slit.

9. A spectral multiplexing apparatus as claimed in claim 1, wherein said optical interlacing device comprises a semi-transparent mirror and two optical filters having a plurality of parallel slots ; said filters being positioned with respect to said mirror for forming an image of the slots of one of said filters interlaced with the slots of said other filter.

10. A spectral multiplexing apparatus as claimed in claim 9, wherein said slots have a constant width and are evenly spaced.

11. A spectral multiplexing apparatus as claimed in claim 9, wherein said slots have distinct widths and are spaced from each other according to a pseudo random law.

12. A spectral multiplexing apparatus as claimed in claim 9, wherein said slots have distinct widths ; the spacing between two successive slots being proportional to the distance of said two slots from the center slot of the array.

13. A spectral multiplexing apparatus as claimed in claim 1, wherein said optical interlacing device comprises a filter have a plurality of parallel slots located between reflecting strips and a semi-transparent mirror positioned obliquely with respect to said strips.

14. A spectral multiplexing apparatus as claimed in claim 13, wherein said reflecting strips are partially covered by a non reflecting coating.

15. A spectral demultiplexing apparatus as claimed in claim 2, wherein said electro optical modulator comprises a transparent plate, electro mechanical transducer means coupled to said plate for exciting therein a deformation wave corresponding to said multiplexed signal, and optical phase contrast means associated with said plate for converting the refractive index changes induced by said wave into corresponding changes of the luminous amplitudes emerging from said modulator.

16. A spectral demultiplexing apparatus as claimed in claim 2, wherein said electro optical modulator comprises a transparent loop carrying a photochromic substance, means for impressing to said loop a constant velocity translation, a writing source of light capable of increasing the optical absorption coefficient of said photochromic substance, an erasing source of light positioned for bleaching said substance and an electro optical modulating cell positioned for modulating a pencil of light emerging from said writing source and incident onto said loop.

17. A spectral demultiplexing apparatus as claimed in claim 16, wherein said writing source is a source of ultra-violet light ; said erasing source being a source of infra-red radiation.

18. A spectral demultiplexing apparatus as claimed in claim 2, wherein said first diffracting system is a converging lens positioned for focusing said beam.

19. A spectral demultiplexing apparatus as claimed in claim 2, wherein said second diffracting system comprises a lens for forming onto the input face of said photoelectric means an image of the output face of said modulator.

20. A spectral demultiplexing apparatus as claimed in claim 2, wherein said photoelectric means comprise a mask having a slit and a photoelectric transducer positioned behind said slit.

21. A spectral demultiplexing apparatus as claimed in claim 2, wherein said optical separating device comprises at least one filter having a plurality of parallel slots.

22. A spectral demultiplexing apparatus as claimed in claim 21, wherein said optical separating device further comprises a semi-reflecting mirror.

23. A spectral demultiplexing apparatus as claimed in claim 21, wherein said slots have a constant width and are evenly spaced.

24. A spectral demultiplexing apparatus as claimed in claim 21, wherein said slots have distinct widths and are spaced from each other according to a pseudo random law.

25. A spectral demultiplexing apparatus as claimed in claim 21, wherein said slots have distinct widths ; the spacing between two successive slots being proportional to the distance of said two slots from the center slot of the array.

26. A spectral demultiplexing apparatus as claimed in claim 21, wherein said filter comprise a plurality of reflecting strips interlaced with said slots.

27. A system including a spectral multiplexing electro-optical apparatus for generating a multiplexed signal whose frequency spectrum comprises interlaced spectral bands respectively belonging to the frequency spectra of N electrical signals, N being an integer at least equal to two, and a spectral demultiplexing electro-optical apparatus for demultiplexing the multiplexed signal supplied by said multiplexing apparatus; said multiplexing apparatus comprising : a monochromatic luminous source emitting N distinct luminous beams, N electro-optical modulators positioned for respectively modulating said N beams, said modulators having respective control inputs respectively receiving said N electrical signals ; N first diffracting systems respectively positioned on the path of said N beams ; an optical interlacing device positioned for receiving the luminous energy diffracted from said N first diffracting systems, said interlacing device supplying an interlaced luminous beam comprising juxtaposed pencils of light respectively diffracted by said N first diffracting systems ; a second diffracting system positioned for receiving said interlaced luminous beam ; and photoelectric means positioned for receiving the diffracted luminous energy emerging from said second system ; said spectral demultiplexing apparatus comprising a monochromatic luminous source emitting a luminous beam ; an electro-optical modulator positioned for modulating said beam, said modulator having a control input for receiving said multiplexed signal resulting from the interlaced spectral multiplexing of said N electrical signals ; a first diffracting system positioned on the path of said luminous beam ; an optical separating device positioned for receiving the luminous energy diffracted by said diffracting system ; said separating device supplying a filtered beam comprising selected portions of the diffracted luminous energy emerging from said first diffracting system ; a second diffracting system positioned for receiving said filtered beam ; and photoelectric means positioned for receiving the luminous rays emerging from said second diffracting system.

* * * * *